(12) United States Patent
Whiting (10) Patent No.: US 7,014,726 B2
(45) Date of Patent: Mar. 21, 2006

(54) ROCK LAMINATE

(75) Inventor: Richard J. Whiting, Lewisville, TX (US)

(73) Assignee: SmartSlate, Inc., Lewisville, TX (US)

( * ) Notice: Subject to any disclaimer, the term of this patent is extended or adjusted under 35 U.S.C. 154(b) by 0 days.

(21) Appl. No.: 10/733,555

(22) Filed: Dec. 10, 2003

(65) Prior Publication Data

US 2004/0121089 A1    Jun. 24, 2004

Related U.S. Application Data (60) Provisional application No. 60/432,607, filed on Dec. 10, 2002.

(51) Int. Cl.
   *B32B 5/00* (2006.01)
   *B44C 5/00* (2006.01)
   *E04F 13/14* (2006.01)

(52) U.S. Cl. ............... 156/230; 156/247; 156/344; 428/15; 428/363; 428/403

(58) Field of Classification Search .......... 156/230, 156/235, 211, 247, 254, 344, 584; 427/289, 427/331, 355, 372.2; 428/15, 195.1, 343, 428/357, 363, 402, 403, 540, 914
See application file for complete search history.

(56) References Cited

U.S. PATENT DOCUMENTS

| | | | | |
|---|---|---|---|---|
| 2,050,761 A | * | 8/1936 | Newsom | 299/15 |
| 3,110,299 A | | 11/1963 | Fox | |
| 3,287,197 A | | 11/1966 | Errede | |
| 3,723,233 A | | 3/1973 | Bourke | 161/68 |
| 3,749,629 A | | 7/1973 | Andrews et al. | 156/276 |
| 3,885,075 A | | 5/1975 | Ferrante | 428/150 |
| 3,950,202 A | | 4/1976 | Hodges | 156/154 |
| 4,022,650 A | | 5/1977 | Gurgui et al. | 156/498 |
| 4,063,982 A | * | 12/1977 | Bourke | 156/254 |
| 4,137,215 A | | 1/1979 | Van Gasse | 260/40 R |
| 4,148,781 A | | 4/1979 | Narukawa et al. | 260/42.51 |
| 4,216,634 A | | 8/1980 | Binder | 52/309.9 |
| 4,218,496 A | | 8/1980 | Savignac | 427/263 |
| 4,223,502 A | | 9/1980 | Robinson | 52/315 |
| 4,366,204 A | | 12/1982 | Briggs | 428/304.4 |
| 4,404,158 A | | 9/1983 | Robinson | 264/263 |
| 4,446,177 A | | 5/1984 | Munoz et al. | 428/15 |
| 4,463,043 A | | 7/1984 | Reeves et al. | 428/68 |
| 4,467,007 A | | 8/1984 | Elgie | 428/142 |

(Continued)

FOREIGN PATENT DOCUMENTS

DE      295 08 372 U1    4/1996

(Continued)

OTHER PUBLICATIONS

Meath, A.R., "Epoxy Resin Adhesives", in Handbook of Adhesives, 3rd.ed. Irving Skeist, editor, 1990, Chapter 19, pp. 347-358.*

(Continued)

*Primary Examiner*—Sue A. Purvis
(74) *Attorney, Agent, or Firm*—Robert J. Ward (57) ABSTRACT

A rock laminate has been provided that includes a layer of rock and a flexible layer. The layer of rock has a plurality of pores that can receive fluid. The flexible layer is positioned above the layer of rock and has a portion which extends into the pores of the layer of rock. Additionally a method for making a rock laminate is provided. The method includes providing a rock having an exposed surface and applying a polymer that bonds with the exposed surface. The polymer is lifted along with corresponding bonded portion of the exposed surface is lifted from the rock.

24 Claims, 4 Drawing Sheets

U.S. PATENT DOCUMENTS

| | | | | |
|---|---|---|---|---|
| 4,657,791 A | 4/1987 | Ukkonen | ...................... | 428/15 |
| 4,664,955 A | 5/1987 | Clem | .......................... | 428/15 |
| 4,668,451 A | 5/1987 | Langson | ...................... | 264/39 |
| 4,734,302 A | 3/1988 | Baskin | ........................ | 428/15 |
| 4,781,870 A * | 11/1988 | Talbert | ........................ | 264/1.9 |
| 4,822,661 A | 4/1989 | Battaglia | .................... | 428/116 |
| 4,855,177 A | 8/1989 | Leis | ........................... | 428/247 |
| 4,882,205 A | 11/1989 | Valenduc | .................... | 427/204 |
| 4,911,138 A | 3/1990 | Leis | .......................... | 125/16 R |
| 5,004,512 A | 4/1991 | Fodera | ........................ | 156/153 |
| 5,078,815 A | 1/1992 | Othon | ......................... | 156/63 |
| 5,208,086 A | 5/1993 | Owens | ........................ | 428/47 |
| 5,244,850 A | 9/1993 | Dutton | ........................ | 501/128 |
| 5,267,499 A * | 12/1993 | Othon | .......................... | 84/291 |
| 5,296,340 A | 3/1994 | Tsukada et al. | .............. | 430/394 |
| 5,298,212 A | 3/1994 | Stecker | ....................... | 264/571 |
| 5,314,554 A | 5/1994 | Owens | ......................... | 156/154 |
| 5,321,055 A | 6/1994 | Slocum | ........................ | 523/171 |
| 5,325,652 A | 7/1994 | Feder | .......................... | 52/746 |
| 5,339,795 A | 8/1994 | Myles | .......................... | 125/21 |
| 5,375,385 A * | 12/1994 | Feder | .......................... | 52/385 |
| 5,516,573 A | 5/1996 | George et al. | .............. | 428/143 |
| 5,543,100 A | 8/1996 | Kluh et al. | ................. | 264/130 |
| 5,562,969 A | 10/1996 | Sakamoto et al. | ........... | 428/207 |
| 5,597,627 A | 1/1997 | Lindeberg | .................... | 428/15 |
| 5,612,116 A | 3/1997 | Jinno et al. | .................. | 428/143 |
| 5,787,666 A | 8/1998 | Sherry | ......................... | 52/315 |
| 5,787,667 A | 8/1998 | Sheahan | ...................... | 52/315 |
| 5,965,234 A | 10/1999 | Solano | ........................ | 428/143 |
| 6,204,312 B1 | 3/2001 | Taylor | ......................... | 524/13 |
| 6,237,294 B1 | 5/2001 | Rygiel | ......................... | 52/314 |
| 6,309,562 B1 | 10/2001 | Sakai et al. | ............ | 252/301.36 |
| 6,360,505 B1 | 3/2002 | Johns | ........................ | 52/311.1 |
| 6,387,504 B1 | 5/2002 | Mushovic | .................... | 428/413 |
| 6,403,004 B1 | 6/2002 | Stecker | ....................... | 264/139 |
| 6,423,167 B1 | 7/2002 | Palmer et al. | .............. | 156/209 |
| 6,436,523 B1 | 8/2002 | Avant, Jr. et al. | ........... | 428/331 |
| 6,479,161 B1 | 11/2002 | Araki et al. | ................. | 428/515 |
| 6,548,157 B1 | 4/2003 | Ghahary | .................. | 428/319.3 |
| 6,699,349 B1 | 3/2004 | Sporle et al. | ........... | 156/244.12 |
| 6,709,717 B1 | 3/2004 | Mushovic | ................... | 427/518 |
| 6,769,215 B1 | 8/2004 | Carkner | ....................... | 52/411 |
| 2002/0041937 A1 | 4/2002 | Clemmer | | |
| 2002/0086140 A1 | 7/2002 | Ghahary | ...................... | 428/143 |
| 2002/0106504 A1 | 8/2002 | Stott | ........................ | 428/315.9 |
| 2004/0035063 A1 | 2/2004 | Bryant et al. | .................. | 52/107 |
| 2004/0115415 A1 | 6/2004 | Thiele et al. | ............ | 428/304.4 |
| 2004/0126557 A1 | 7/2004 | Thiele et al. | ............ | 428/304.4 |
| 2004/0126602 A1 | 7/2004 | Wallner | ...................... | 428/500 |

FOREIGN PATENT DOCUMENTS

| | | |
|---|---|---|
| DE | 19522875 A1 | 10/1996 |
| DE | WO 01/75246 | 10/2001 |

OTHER PUBLICATIONS

Advertisement for Ytterstone FlexSandStein, located at internet website: http://www.ytterstone.de/, dated Jun. 6, 2005, 20 pages.

Advertisement for Beaumont Tiles at the Internet website for Beaumont Tiles, http://www.beaumont-tiles.com.au/guide/slate.html, dated Oct. 10, 200__; 4 pgs..

Article entitled Exploring the Etymology of Sedimentary, Igneous, and Metamorphic Rocks, *Rock Cycle-Rocks(3A) Pre Lab*, at the Internet website http://www.msnucleus.org/membership/html/k-6/rc/rocks/3/rcr3__1b.html, dated Oct. 10, 200__; 1 pg.

Cover Story : Slate of Ages, Rutland Herald at the Internet website for Rutland Herald, http://rutlandherald.nybor.com/Archive/Articles/Article/652, dated Oct. 10, 200__; 6 pgs.

Article entitled Physical Geography, Earth Science, Types of Rocks: Igneous, Metamorphic and Sedimentary, at the Internet website http://www.zephryus.demon.co.uk/geography/tvs/lesons/Rocks01.html, dated Oct. 10, 200__; 2 pgs.

U.S. Appl. No. 08/427,965 filed Apr. 26, 1995 entitled "Flexible Sheet Materials Having Decorative Rock Surface and Processes for Making Same"; Inventor: Gernot Ehrlich.

* cited by examiner

ROCK LAMINATE

CROSS-REFERENCE TO RELATED APPLICATIONS

Pursuant to 35 U.S.C. § 119 (e), this application claims priority from, and hereby incorporates by reference for all purposes, U.S. Provisional Patent Application Ser. No. 60/432,607, entitled Rock Laminate, naming Richard J. Whiting as inventor, filed Dec. 10, 2002.

TECHNICAL FIELD OF THE INVENTION

This invention relates in general to the field of building materials, and more particularly to a rock laminate and method for making the same.

BACKGROUND OF THE INVENTION

Natural rock or stone is a desired building material because of its beauty and durability. Unfortunately, natural rock and stone suffers from several disadvantages such as cost, weight, flexibility, and ease of installation. For example, the weight of natural rock or stone results in increased shipping and handling costs and also increased installation costs. Installation costs are increased, among other reasons, because of the need to build support structures capable of handling the heavy weight of natural rock or stone building materials. Additionally, care must be taken to avoid or minimize breakage that can occur with the rock or stone in transport. This results in increased shipping costs. Furthermore, certain applications require flexible building materials, which eliminates the use of natural rock or stone because of their rigidity.

Attempts to solve the disadvantages inherent in the use of natural rock or stone as a building material have primarily focused on the development and use of synthetic or man-made products to simulate the beauty of natural rock and stone. Unfortunately, such products cannot match the beauty of nature in texture, color and look, and often fail to have the durability of natural rock. Other attempts have focused on cutting or slicing natural rock or stone into layers, such as quarter-inch thick layers, using various processes, such as wet saws. These techniques still suffer from the disadvantages of high material and production cost, relatively heavy weight, and inflexibility.

SUMMARY OF THE INVENTION

From the foregoing it may be appreciated that a need has arisen for a rock laminate and method for making the same. In accordance with the present invention, a rock laminate and corresponding methods are provided that substantially eliminate one or more of the disadvantages and problems outlined above.

According to an aspect of the present invention, a method for making a rock laminate is provided that includes providing a rock having an exposed surface, applying a polymer to at least a portion of the exposed surface of the rock such that a portion of the exposed surface is bonded to the polymer, and lifting a portion of the polymer, along with the corresponding bonded portion of the exposed surface, away from the rock to produce the rock laminate and to expose a new surface of the rock. A rock laminate made according to the method discussed above may be considered an aspect of this invention.

Other aspects of the present invention may include a flexible rock laminate. In such a case, further aspects may include rolling the rock laminate away from the rock to expose a new surface; flexing the rock laminate until a desired shape is acquired; molding the rock laminate around an object; and heating the rock laminate until the rock laminate exhibits a desired flexibility.

Yet other aspects of the invention may include curing the polymer after application of the polymer to the exposed surface of the rock; applying an additive to the polymer; applying a sealer to the rock side of the rock laminate; and the rock is provided as, for example, shale, limestone, sandstone, mudstone, slate, quartzite, phyllite, mica schist, chlorite schist, gneiss, talc schist, glaucophane schist, prasinite, epidote amphibolite, amphibolite, embrechite, agmatite, calc schist and mylonite.

Other aspects of the present invention may include a rock laminate that includes a layer of rock and a flexible layer. The layer of rock has a surface and plurality of pores defined by small openings in the surface of the layer of rock, the plurality of pores operable to receive a fluid. The flexible layer is positioned above at least a portion of the exposed surface of the layer of the rock and in at least a portion of the plurality of pores of the layer of rock. The portion of the flexible layer positioned in at least a portion of the plurality of pores of the layer of rock is received by the plurality of pores as a fluid and then becomes substantially a solid. In such an aspect, further aspects can include the layer of rock having a thickness of 2 mm or less, the flexible layer including an additive, the flexible layer being made of an organic polymer, and a rock side of the rock laminate including a sealant.

The various embodiments and implementations of the present invention provide a profusion of potential technical advantages and benefits. A technical advantage of the present invention may include the capability to inexpensively, especially when compared to conventional techniques, manufacture thin rock laminates that contain a layer of natural stone that provides the beauty and surface durability characteristics of the natural stone, without the corresponding weight and cost. This results in reduced installation costs, shipping costs, and material cost, while providing the same beauty of natural stone for use as a building material.

Another technical advantage of the present invention may include the capability to transform one slab of metamorphic rock, such as slate, into numerous rock laminates, thus conserving limited natural resources while enjoying the benefits and beauty of such natural rock many times more than what would be provided by one such slab of natural rock.

Yet another potential benefit of the present invention may include, in certain embodiments, the capability to make flexible rock laminates that may be used in virtually any application, such as in simulated solid rock columns, simulated solid rock tables, and to cover furniture, and various other items.

Still yet another technical advantage of the present invention may include the capability to use such rock laminates, either alone or in combination with other materials, in any of a variety of building material applications. For example, the rock laminates of the present invention may be used as roof shingles, countertop laminates, floor tile, wall coverings, column coverings, and the like.

Other technical advantages are readily apparent to one skilled in the art from the following figures, description, and appendices.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

Virtually all rocks may be generally classified or fit into one of three main groups that include igneous, metamorphic and sedimentary. These groups are defined according to the believed origins of the rocks. Igneous rocks are thought to be formed from molten rock, whether on the surface or below the surface. Sedimentary rocks are created from sediment, which is the particles of other older rocks, and are formed from the accumulation of eroded materials at the earth's surface. Metamorphic rocks are of either igneous or sedimentary origins and have been altered due to heat and/or pressure, with potential help from chemically active fluids. Metamorphic rocks are believed to have formed below the surface of the earth because of the intense heat and pressure that is present at such depths. Although the present invention is not limited to any one of these three main groups, the preferred rocks or stones are metamorphic and sedimentary rocks that have directional fabric or structure that is capable of releasing the rock or stone's stratum. Such a directional fabric or structure is believed to give the rock a foliation, allowing individual rock layers to be released more easily. Rocks having such a preferred directional fabric or structure can be found in various parts of the world, including regions of India, Brazil, South Africa, the United States, France and England. The use of the term rock herein shall be understood to also include the term stone.

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementations illustrated and described herein. Additionally, the drawings contained herein are not drawn to scale; and, in some instances have been skewed for ease of illustration.

Figure 1:
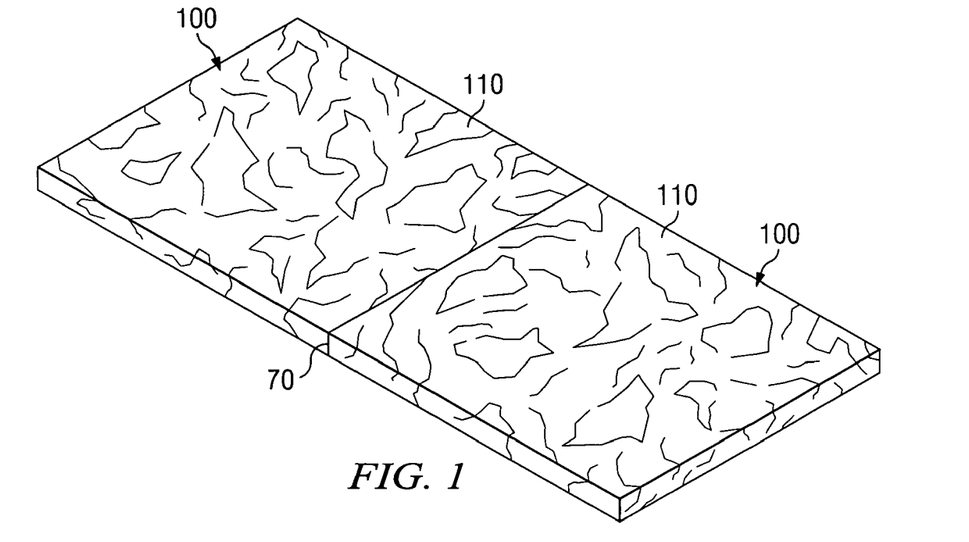
FIG. 1 is a top, perspective view of slate pieces, aligned end to end.

FIG. 1 is a top, perspective view of slate pieces 100, which may be considered metamorphic rocks. While the use of "slate" has been described in one aspect of the invention, it is to be expressly understood that in other aspects of the invention, other rocks can be used. As such, the foregoing description is intended as only setting forth illustrative concepts, which can be expounded upon by one of ordinary skill in the art.

The slate pieces 100 of FIG. 1 have been shown aligned end to end such that a continuous rock laminate 400 (FIG. 5) may be formed—e.g., a rock laminate 400 (FIG. 5) having a larger cross-sectional area than each of the slate pieces 100. The joints 70 between the slate pieces can be filled with any suitable material known by one of ordinary skill in the art—e.g., grout, silicone, plastic and the like. The preferred material for filling the joint is a polyethylene. The material within the joint 70 helps to prevent seeping of polymer 200 (FIG. 2) into the joint. In other configurations, no material is placed within the joint 70.

While the slate pieces are shown aligned end to end in FIG. 1, it should be understood that other configurations of multiple slate pieces 100 can be utilized—e.g., slate pieces 100 aligned side by side. Additionally, in some configurations different type of rocks or textures of slate pieces 100 can be utilized, being arranged with a combination of side by side and end to end arrangements, forming a mosaic, a random pattern or the like. Other configurations should become apparent to one of ordinary skill in the art. While slate pieces 100 are shown in FIG. 1 in isolation as cut pieces, it is to be expressly understood that in other aspects of the invention, the rock or slate pieces 100 can be in situ (that is, in their original or natural place or site), being processed as described below, in situ. For example, the rock or slate pieces 100 may include an exposed surface 110 in a rock or slate quarry.

In a preferred aspect of the invention, the exposed surfaces 110 of the slate pieces 100 are first cleaned of debris, chips, and foreign material prior to applying an a polymer. Other undesirable items that may be removed, include, but are not limited to, sharp edges, tooling marks, and hard crystal deposits (e.g., garnets or unwanted igneous rock embedded within the working stone).

Various cleaning and removal techniques can be utilized including, but not limited to vacuums, forced air, brushes, chemical cleaners, hand or machine chisels, sanding, grinding, sandblasting, steam cleaning, and cryocleaning (e.g., with dry ice). Other cleaning methods should become apparent to one of ordinary skill in the art. While such cleaning is preferred, it is to be understood that other aspects of the invention may not utilize cleaning.

In some implementations of the invention, a mold, such as an injection molding, can be provided above the exposed surface 110 of the slate piece 100 to outline a defined area, shape or dimension, so that a desired polymer pattern, shape or dimension can be created. Details of such an implementation are described below with reference to FIG. 7.

Figure 2:
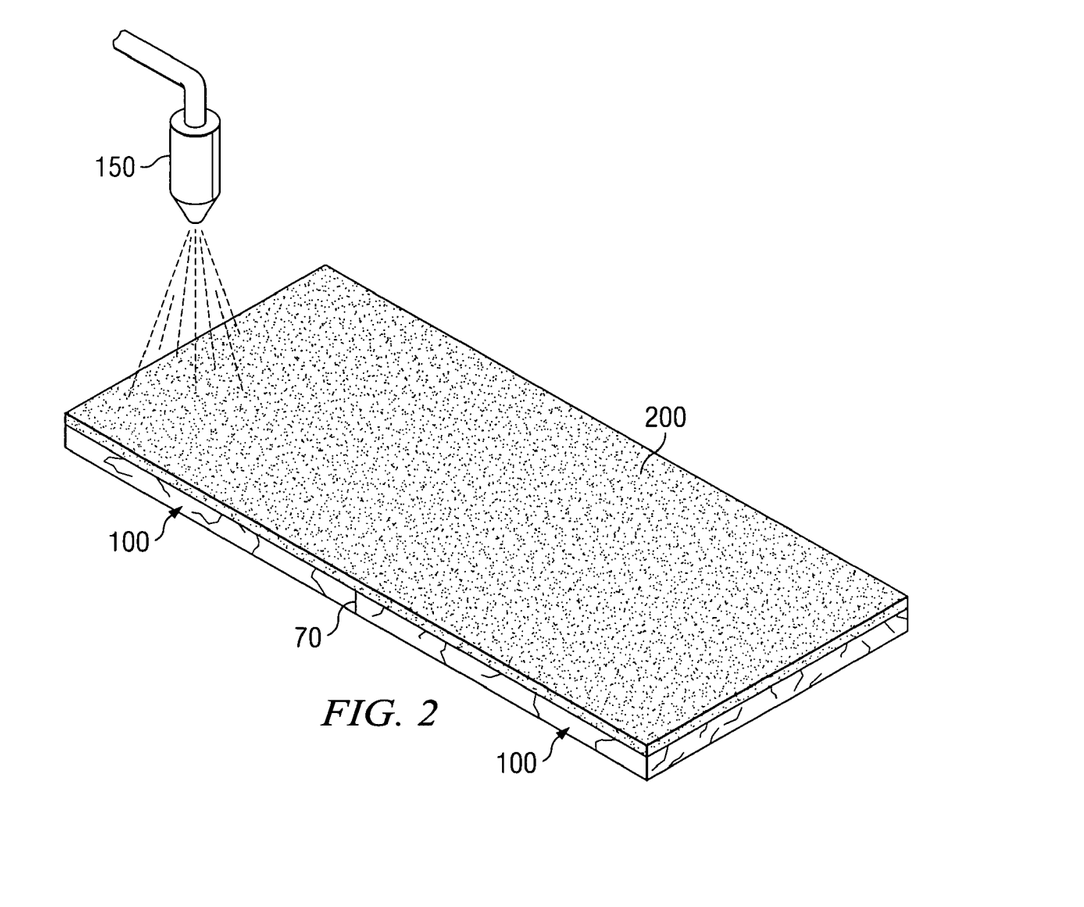
FIG. 2 is a top, perspective view of the two slate pieces of FIG. 1, with a polymer layer applied to their exposed surfaces.

FIG. 2 is a top, perspective view of the top two slate pieces 100 of FIG. 1, with a layer of polymer 200 applied to their exposed surfaces 110. The term "polymer" as use herein is meant to include not only what would be considered a polymer according to the various available and accepted definitions of the word "polymer," but also to include virtually any substance operable or capable of being applied to the surface of a porous rock, such as slate, and positioned within some of the pores or openings of the rock to bind to the rock. While only two slate pieces 100 are shown end to end having a layer of polymer 200 thereon, it should be expressly understood that more or less slate pieces 100 can be utilized. For example, some implementations of the invention may utilize only one slate piece 100 while other implementations may utilize three or more slate pieces 100.

The preferred polymer 200 in this implementation of the invention is a polyurethane; however, other materials now known or later developed can be used as will become apparent to one of ordinary skill in the art—e.g., resins, polyurea, organic materials and the like. The application of the polymer 200 to the exposed surfaces 110 can be accomplished in any of a variety of manners including but not limited to spraying with a spray nozzle 150, brushing, pouring, and heat laminating—the techniques of exposing the surfaces, including any known enhancement processes known by one of ordinary skill in the art, e.g., pressure application enhancements. In applications with molds on top of the exposed surfaces 110, the polymer 200 can be poured within the mold. Upon being applied to the slate pieces 100, the polymer 200 penetrates at least a portion of the exposed surface 110 of the slate pieces 100. As an example, and intended for illustrative purposes only, in one implementation of the invention, the polymer 200 can extend into micropores of the exposed surfaces 110 of the slate pieces 100.

After the polymer 200 is applied to the slate pieces 100, the polymer 200 can be cured. To speed production time, the curing process, in one implementation of the invention, may be sped up using any known or available techniques such as, for example, thermal heating, catalysts, infrared radiation, electron beam accelerators, ultraviolet light sources or gamma ray process. Gamma radiation, using radioactive cobalt atoms, is preferred in one implementation of the invention when considerable depth of treatment is necessary. In yet other implementations of the invention, specifically designed formulations of polymers can be utilized to accelerate the curing process. While the speeding up of a curing process is described with regard to one implementation of the invention, other implementations of the invention may not utilize a sped-up curing technique or process; and, in some implementations of the invention, the process of curing may be slowed. For example, to temporarily slow curing prior to or during delamination (described with reference to FIGS. 3–4), chilled air or gas can be applied. The curing rate may, to a certain degree, depend on the particular dynamics of a particular polymer coating operation.

Before the polymer 200 is applied, or shortly thereafter, additives or fillers may be added to the polymer 200 to enhance characteristics of the polymer 200. For example, the polymer 200 may have additives, such as pigments, fire-retardants, fibers, fillers, recycled materials, compounds for chemical and UV resistance, and ion charged particles.

Other additive materials include chopped or woven fiber-glass or other fabrics that can be applied during, before or after curing of the polymer 200. Polymers 200 can be clear, opaque, tinted, color contrasted or color matched to that of the stone or as desired. Due to the fact that the present invention, in one implementation, results in a thin stone or rock laminate, the stone itself may be clear or partially transparent so that the color of the polymer 200 can be see through the clear or transparent stone. Thus, the color of the polymer 200 may be fully or partially visible from the stone side of the rock laminate. In one embodiment, an opaque polymer backing may be desirable, such as for back lighted signs, stained glass windows, lamp shades, shutters, etc.

Figure 3:
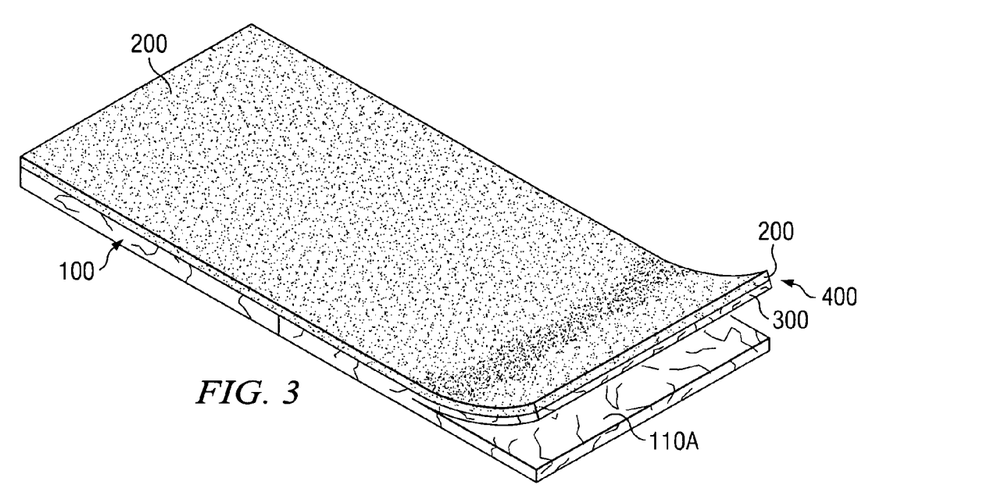
FIG. 3 is a top, perspective view showing the polymer and the thin layer or laminate of slate being lifted or rolled from a slate piece to form a slate rock laminate.

FIG. 3 is a top, perspective view of the polymer 200 and the layer of rock, the laminate of slate, or the thin slate layer 300 being lifted or rolled from the underlying slate piece 100 to form a rock laminate 400. This process may be referred to as the delaminating process because the thin slate layer 300, part of the underlying slate piece 100, is being lifted from the underlying slate piece 100. The rock laminate 400 in this implementation of the invention includes two layers bonded together: the polymer 200 and the thin slate layer 300. The term "bond" and "bonded" as used herein includes, but is not limited to, both physical and chemical bonding. The rolling or lifting is started by lifting, separating and/or peeling the rock laminate 400, which may also be referred to as veneer,(e.g., by grabbing and pulling the polymer 200, the bonded thin slate layer 300 being coupled thereto at a first edge) to reveal a new strata or a new surface 110A of the rock or slate piece 100. The rolling or lifting can be accomplished by hand or with machine or mechanical assistance. The thickness of the thin slate layer 300 can be varied, according to the polymer 200 and slate piece 100 being utilized as well as the application technique of the polymer 200 onto the slate piece. As an example, the slate pieces 100 may have different porosities and the polymers 200 may have different viscosities—both the viscosity and porosity effecting penetration depth of the polymer 200 into the pores of the slate piece 100. As another example, the utilization of a pressure in application of the polymer 200 may effect the penetration depth of the polymer 200 into the pores of the slate pieces 100. Pressure may be applied to the polymer 200 using any known or available method or technique for using pressure to allow the polymer to further penetrate the slate piece 100. In one configuration of the invention, the thin slate layer 300 is less than two millimeters thick. In other configurations the thin slate layer 300 may be in range of $\frac{1}{12}$ to 5 millimeters. In yet other configurations, the thin slate layer 300 may have a larger or smaller thickness. Similar to the thin slate layer 300, the polymer 200 may have varying thickness. Such thickness, to a certain degree, will depend on the polymer 300 utilized. In one configuration of the invention, the polymer can be in the range of $\frac{5}{6}$ to 6 millimeters. In yet other configurations, the polymer 200 may have a larger or smaller thickness.

The polymer 200 provides added strength, potential flexibility and durability to the rock laminate 400. The cured delaminated polymer 200 adheres to and picks up the thin slate layer 300, which should provide a surface and natural texture similar to or nearly exactly like the previously exposed surface 110 of the slate piece 100 (FIG. 1).

Only one slate piece 100 is shown in FIG. 3 for ease of illustration; however, it should be expressly understood that several slate pieces 100 can be aligned end to end to produce larger rock laminates 400. With several slate pieces 100 aligned end to end (e.g., FIG. 2), the delaminating process continues onto the next slate piece 100 with the polymer 200 holding the rock laminate 400 together.

Figure 4:
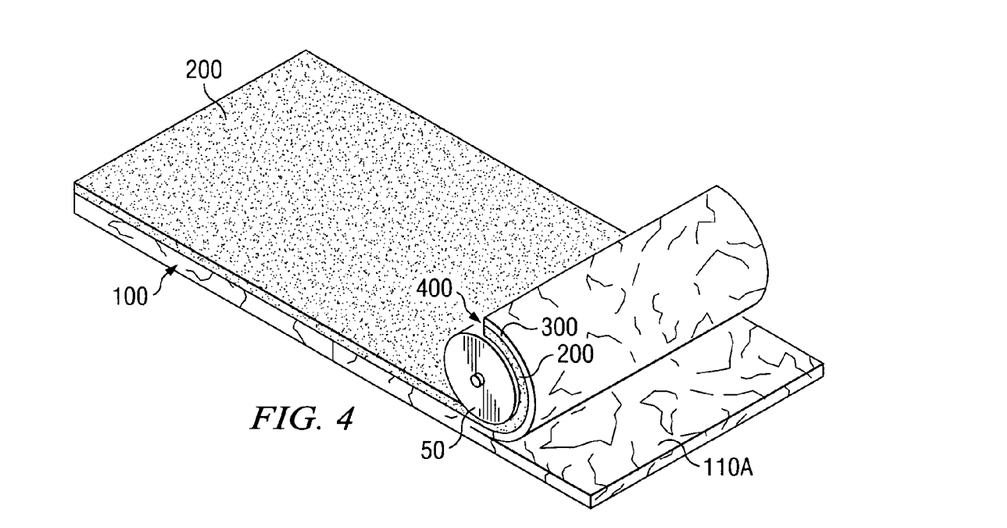
FIG. 4 is a top, perspective view further showing the lifting or rolling away of the polymer and the thin layer or laminate of slate from the slate piece.

FIG. 4 is a top, perspective view further showing the lifting or rolling away of the polymer 200 and the thin slate layer 300 from the slate piece 100. To facilitate such a process, a roller 50 can be used. By changing the diameter of the roller 50, the degree of large and small chips or flakes comprising the thin slate layer 300 may be changed. In some implementations of the invention, compressed air pressure or thermal energy can be used to assist with lifting or delaminating.

The rock laminate 400 on the roller 50 shows in more detail the delamination of the thin slate layer 300 and revealing of a new surface 110A of the slate piece 100—alternatively viewed as a peeling of a layer from the slate piece 100. Additionally shown in more detail is the adherence of texture of the previously exposed surface 110 of slate piece 100 (FIG. 1)—now part of the thin slate layer 300—to the polymer 200.

Once again, only one slate piece 100 is shown in FIG. 4 for ease of illustration; however, it should be expressly understood that several slate pieces 100 can be aligned end to end to produce larger rock laminates 400.

With reference to FIG. 4, another implementation of the invention can be seen. A desired thickness of a slate piece 100 can be obtained via stripping layers of the rock, e.g., in the creation of numerous rock laminates 400. As an example, intended for illustrative purposes only, the slate piece 100, e.g., of FIG. 1, can initially be on the order of one inch thick. Three quarters of that thickness can be processed, according to the above technique to form several sheets of rock laminate 400. The remaining portion of the slate piece 100, e.g., a quarter of an inch thick, can be utilized in any traditional application of a slate piece 100—known by one of ordinary skill in the art, including those currently known and those developed in the future, e.g., applying a substrate to the slate piece 100 to form a composite slab. Such substrates include, but are not limited to, honeycomb, wood, metal, plastics, glass, foams, cement board, concrete, and the like. Such a process of obtaining a desired thickness in slate piece 100 provides an alternative to other methods of obtaining a desired thickness of a slate piece 100—e.g., sawing of the slate piece 100.

Figure 5:
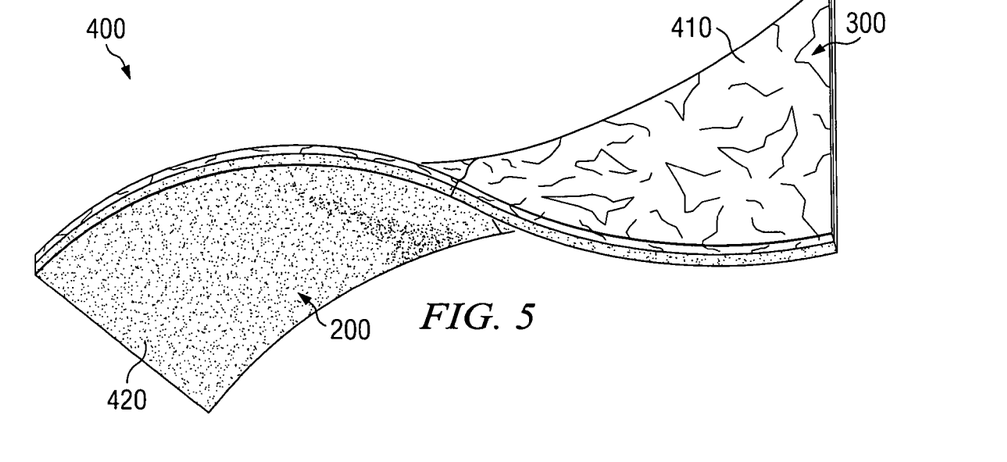
FIG. 5 is a side, perspective view showing the resulting polymer and thin layer or laminate of slate, both of which constitute the slate rock laminate according to an aspect of the present invention, that was rolled or peeled from the two slate pieces as shown in FIGS. 1–2.

FIG. 5 is a view of the resulting polymer 200 and thin slate layer 300, both of which constitute the rock laminate 400 of the present invention, that was lifted, rolled or peeled from the two slate pieces 100 as shown in FIGS. 1 and 2. FIG. 5 illustrates the thinness, lightness, flexibility and virtually identical surface look of the rock laminate 400 to the slate pieces 100 from which it was removed (FIG. 1).

In one implementation of the invention, the rock laminate 400 can be further cured after the delaminating process. For example, sheets of rock laminate 400 can be hung on supports and dried either naturally or via application of thermal energy. In another implementation of the invention, once the rock laminate 400 is removed, a clear or transparent sealer, which is known in the art, is preferably applied to the rock side 410 of the rock laminate 400 to protect the surface of the rock side 410, depending on the planned use of the rock laminate 400. And, in some implementations of the invention, the sealant can help increase the bond between various layers or strata that may exist in the thin slate layer 300. The preferred method of applying the sealer is via use of a paint curtain or spray with a recovery tank—for excess sealer. An air knife can additionally be used to blow off excess sealer and assist drying.

If desired, a suitable adhesive could be applied to the polymer side 420 of the rock laminate 400 for attachment to any of a number of known objects or desired substrate materials.

Figure 6:
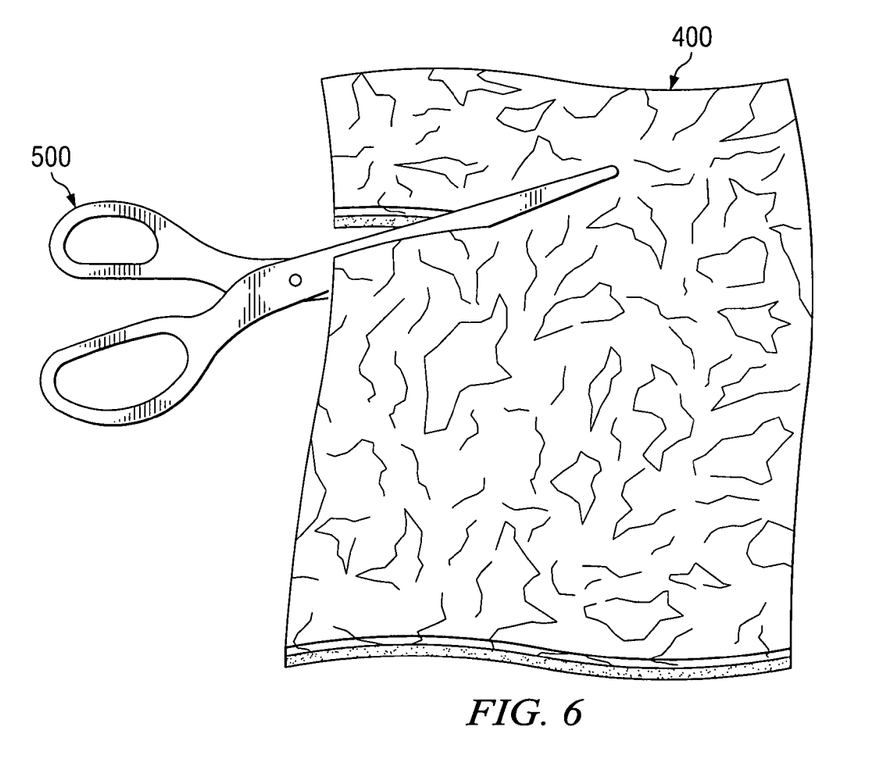
FIG. 6 is an illustration showing the ease in which the finished rock laminate may be cut, flexed, molded or manipulated using simple hand tools, such as household scissors.

FIG. 6 is an illustration of the ease in which the finished rock laminate 400 may be cut or manipulated using simple hand tools, such as household scissors 500. Other devices for cutting or perforating the rock laminate 400 include, but are not limited to knives, hot wire cutters, die cutters, roller die splitters, pressure cutting, and shears. In some implementations of the invention, pre-heating may facilitate the cutting process.

In accordance with one implementation of the invention, further processing of the rock laminate 400 can occur. For example, products such as trim molding, planks, boards, rails, and the like, can be made by extruding or pulling the rock laminate 400 through a heated roller system. Additionally, substrate materials can be bonded to the backside of polymer side 420 (FIG. 5), the substrate materials including, but not limited to honeycomb, wood, metal, plastics, glass, foams, cement board, concrete, and the like.

According to another implementation of the invention, texture can be added to the polymer side 420 (FIG. 5), utilizing techniques such as grinding, rolling, pressing, or laying of materials on the polymer side. Other techniques include laminating a grid made of a nonstick material (e.g., polyethylene) onto the polymer side 420 and then delaminating the grid from the polymer side 420 to leave a patterned texture. Furthermore, open or closed sprays can be used to apply cell foam for texture known in the polyurethane industry. Yet other techniques include application of a pressure sensitive adhesive.

The rock laminate 400 of the present invention may be used in numerous applications. For example, the rock laminate 400 can be used as an interior wall covering for living rooms, dens, kitchens, bed rooms, and bathrooms. It may also be used as a roofing shingle, or to cover doors, exterior sidings, columns, pillars, foundation cladding, and trade show displays and virtually any appliance or fixture. It may be used as a flooring material, as crown and trim molding, to cover windows, decorative mirror and picture frames, etc.

The rock laminate 400 in certain implementations of the invention can be used as or with a mold, such as a precasting lining, for concrete columns, pillars, foundations, railings, and fence posts. In other embodiments, it may be used to cover cabinets, countertops, back splashes, furniture, and any number of home and office furnishings. Other uses of the rock laminate 400, such as a slate rock laminate, include as wallpaper, as appliance accents to cover stereo equipment, and as custom signs, such as with inlay letters and numbers. The rock laminate 400 may be further used for garden decorations, such as to cover bird houses, butterfly houses, bird baths, flower planters, benches, and for vehicle trim, such as for boats, RVs, custom cars, trucks, and planes.

Figure 7:
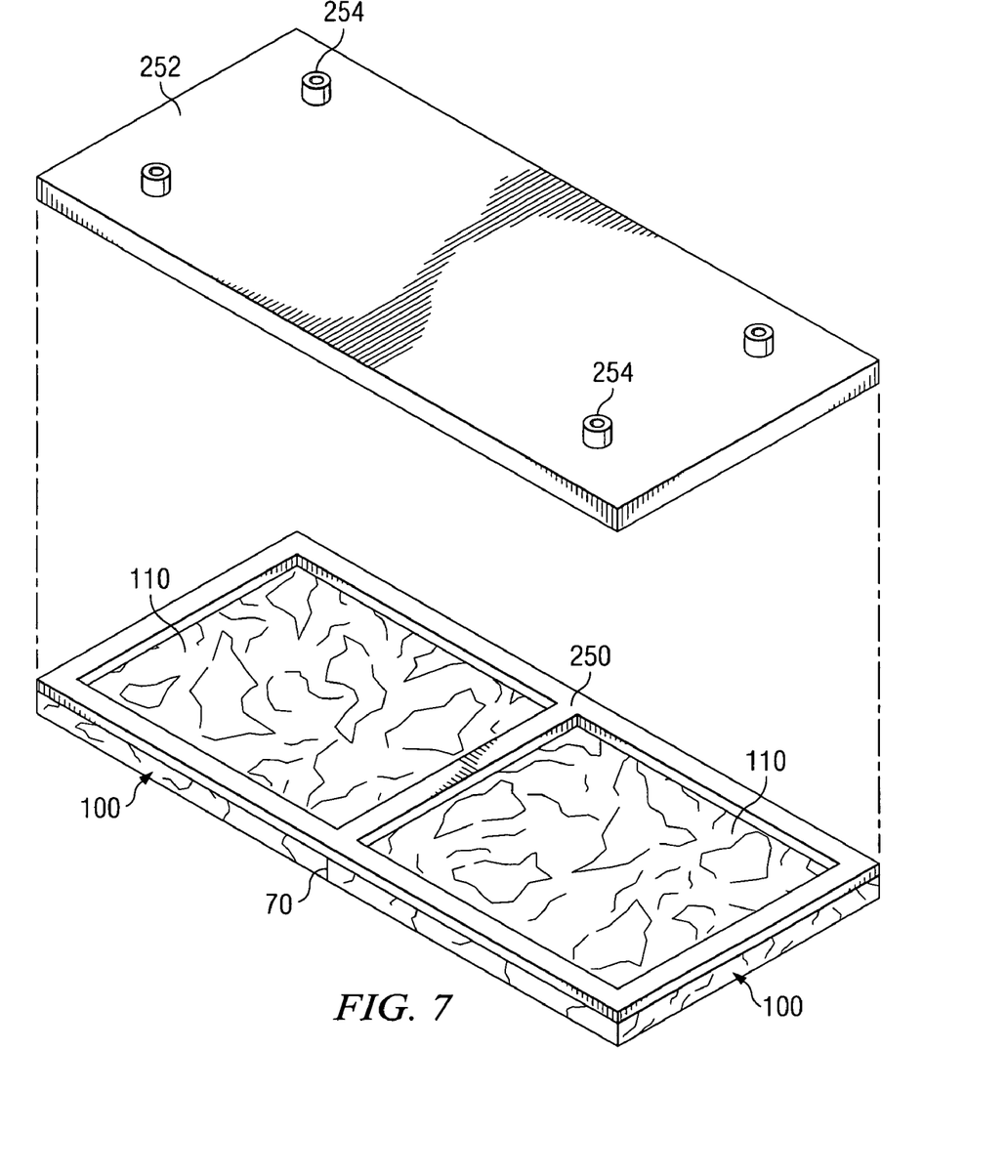
FIG. 7 is a top, perspective view of a polymer application technique, according to an aspect of the invention.

FIG. 7 is a top, perspective view of a polymer application technique, according to an aspect of the invention. An injection mold 250 has been placed on the exposed surfaces 110 of the slate pieces 100. The injection mold covering 252 can be placed on the injection mold 250 and polymer 200 can be pressure injected through nozzles 254 to coat the exposed surfaces 110 of the slate pieces 100. While such a polymer application technique has been shown, it should be expressly understood that other polymer application techniques can be utilized, including those described herein as well as those that are now known or later developed by one of ordinary skill in the art.

Thus, it is apparent that there has been provided, in accordance with the present invention, a rock laminate, such as a rock laminate or slate laminate, and corresponding method to make such a rock laminate that satisfies one or more of the advantages set forth above. Although the preferred embodiment has been described in detail, it should be understood that various changes, substitutions, and alterations can be made herein without departing from the scope of the present invention, even if all of the advantages and benefits identified above are not present. For example, the various elements or components may be combined or integrated in another system or certain features may not be implemented. Also, the techniques, systems, sub-systems, layers, compositions and methods described and illustrated in the preferred embodiment as discrete or separate may be combined or integrated with other systems, techniques, or methods without departing from the scope of the present invention. For example, the sealant (applied to the rock side 410) and the polymer 200 may have additives, such as pigments and fillers, as well as coating auxiliaries, for example anti-settling agents, antifoams and/or wetting agents, flow agents, reactive diluents, plasticizers, catalysts, auxiliary solvents, thickeners and the like—including ground or powdered slate, calcium carbonate, and recycled polymers. In certain embodiments of the present invention, multiple layers may be used without departing from the present invention. Further, each such layer may be made of the same or different materials and still fall within the scope of the present invention. Other examples of changes, substitutions, and alterations are readily ascertainable by one skilled in the art and could be made without departing from the spirit and scope of the present invention.

What is claimed is:

1. A method for making a rock laminate, the method comprising:
   providing a rock having an exposed surface;
   applying a polymer to at least a portion of the exposed surface of the rock such that a portion of the exposed surface is bonded to the polymer; and
   lifting a portion of the polymer, along with the corresponding bonded portion of the exposed surface, away from the rock to produce the rock laminate and to expose a new surface of the rock, wherein the rock laminate is flexible.

2. The method of claim 1, further comprising:
   providing the rock having the new surface;
   applying a polymer to at least a portion of the new surface of the rock such that a portion of the new surface is bonded to the polymer; and
   lifting a portion of the polymer, along with the corresponding bonded portion of the new surface, away from the rock to produce a second rock laminate and to expose a second new surface of the rock.

3. The method of claim 1, wherein lifting a portion of the polymer includes rolling the rock laminate away from the rock to expose the new surface.

4. The method of claim 1, further comprising:
   flexing the rock laminate until a desired shape is acquired.

5. The method of claim 1, further comprising:
   molding the rock laminate around an object.

6. The method of claim 1, further comprising:
   heating the rock laminate until the rock laminate exhibits a desired flexibility.

7. The method of claim 1, further comprising:
   curing the polymer after application of the polymer to the exposed surface of the rock.

8. The method of claim 7, wherein curing occurs after lifting a portion of the polymer, along with the corresponding bonded portion of the exposed surface, away from the rock.

9. The method of claim 7, further comprising:
   increasing the rate of the curing of the polymer via application of a curing technique.

10. The method of claim 1, wherein applying a polymer to at least a portion of the exposed surface includes use of a mold.

11. The method of claim 1, further comprising:
    applying an additive to the polymer.

12. The method of claim 1, further comprising:
    applying a sealer to a rock side of the rock laminate.

13. The method of claim 1, wherein the rock is a metamorphic rock.

14. The method of claim 1, wherein the rock is a sedimentary rock.

15. The method of claim 1, wherein the rock is selected from the group consisting of shale, limestone, sandstone, mudstone, slate, quartzite, phyllite, mica schist, chlorite schist, gneiss, talc schist, glaucophane schist, prasinite, epidote amphibolite, amphibolite, embrechite, agmatite, calc schist and mylonite.

16. The method of claim 1, wherein the rock provided is in situ.

17. A method for creating a flexible metamorphic rock laminate, the method comprising:
    providing a metamorphic rock with a first surface;
    positioning a polymer on at least a portion of the first surface of the metamorphic rock such that a portion of the first surface of the metamorphic rock adheres to the polymer; and
    delaminating at least a portion of the polymer, along with the corresponding bonded portion of the first surface, away from the metamorphic rock to produce the flexible metamorphic rock laminate, which includes the metamorphic rock portion and the polymer, and to expose a new surface of the metamorphic rock.

18. The method of claim 17, further comprising:
    applying a color additive to the polymer.

19. The method of claim 17, further comprising:
    applying a filler to the polymer before positioning the polymer on at least the portion of the first surface of the metamorphic rock.

20. The method of claim 17, further comprising:
    applying a sealer to a rock side of the flexible metamorphic rock laminate.

21. The method of claim 17, wherein the metamorphic rock is provided in situ in a quarry.

22. The method of claim 17, wherein the flexible metamorphic rock laminate has a first side that includes the metamorphic rock portion and a second side that includes the polymer, wherein the flexible metamorphic rock laminate is provided at a thickness that allows at least a portion of the polymer to affect the appearance of the first side of the flexible metamorphic rock laminate.

23. The method of claim 17, wherein the flexible metamorphic rock laminate has a thickness that is at least $1/12$ mm and not more than 2 mm.

24. The method of claim 17, wherein the metamorphic rock portion of the flexible metamorphic rock laminate has a thickness that is not more than 1 mm.

* * * * *